United States Patent
Merriman et al.

(10) Patent No.: US 9,646,036 B2
(45) Date of Patent: *May 9, 2017

(54) SYSTEM AND METHOD FOR DETERMINING EXACT LOCATION RESULTS USING HASH ENCODING OF MULTI-DIMENSIONED DATA

(71) Applicant: MongoDB, Inc., New York, NY (US)

(72) Inventors: Dwight Merriman, New York, NY (US); Eliot Horowitz, New York, NY (US)

(73) Assignee: MongoDB, Inc., New York, NY (US)

(*) Notice: Subject to any disclaimer, the term of this patent is extended or adjusted under 35 U.S.C. 154(b) by 34 days.

This patent is subject to a terminal disclaimer.

(21) Appl. No.: 14/628,829

(22) Filed: Feb. 23, 2015

(65) Prior Publication Data
US 2015/0161122 A1  Jun. 11, 2015

Related U.S. Application Data

(63) Continuation of application No. 13/037,969, filed on Mar. 1, 2011, now Pat. No. 8,965,901.

(51) Int. Cl.
*G06F 12/08* (2016.01)
*G06F 17/30* (2006.01)

(52) U.S. Cl.
CPC .... *G06F 17/3033* (2013.01); *G06F 17/30333* (2013.01); *Y10S 707/99942* (2013.01);
(Continued)

(58) Field of Classification Search
None
See application file for complete search history.

(56) References Cited

U.S. PATENT DOCUMENTS 6,324,654 B1   11/2001   Wahl et al.
6,687,846 B1   2/2004   Adrangi et al.
(Continued)

OTHER PUBLICATIONS

"Bigtable: A DIstriubted Storage System for Structured Data," by Fay Chang, Jeffrey Dean, Sanjay Ghemawat, Wilson C. Hsieh, Deborah A. Wallach, Mike Burrows, Tushar Chandra, Andrew Fikes, Robert E. Gruber, OSDI'06: Seventh Symposium on Operating SYstem Design and Implementation, Seattle, WA, Nov. 2006.
(Continued)

*Primary Examiner* — Adam Tissot
*Assistant Examiner* — Paul Castro
(74) *Attorney, Agent, or Firm* — Wolf, Greenfield & Sacks, P.C.

(57) ABSTRACT

Aspects of the present invention are directed to system and methods for optimizing identification of locations within a search area using hash values. A hash value represents location information in a single dimension format. Computing points around some location includes calculating an identification boundary that surrounds the location of interest based on the location's hash value. The identification boundary is expanded until it exceeds a search area defined by the location and a distance. Points around the location can be identified based on having associated hash values that fall within the identification boundary. Hashing operations let a system reduce the geometric work (i.e. searching inside boundaries) and processing required, by computing straightforward operations on hash quantities (e.g. searching a linear range of geohashes), instead of, for example, point to point comparisons.

25 Claims, 11 Drawing Sheets

(52) U.S. Cl.
CPC  *Y10S 707/99945* (2013.01); *Y10S 707/99957* (2013.01)

(56) References Cited

U.S. PATENT DOCUMENTS

| | | | |
|---|---|---|---|
| 7,032,089 | B1 | 4/2006 | Ranade et al. |
| 7,177,866 | B2 | 2/2007 | Holenstein et al. |
| 7,246,345 | B1 | 7/2007 | Sharma et al. |
| 7,370,054 | B1* | 5/2008 | Martin ............... G06F 17/30949 707/747 |
| 7,567,991 | B2 | 7/2009 | Armangau et al. |
| 7,617,369 | B1 | 11/2009 | Bezbaruah et al. |
| 7,640,288 | B2* | 12/2009 | Yao ....................... H04W 4/003 455/414.2 |
| 7,707,166 | B1 | 4/2010 | Patterson |
| 7,873,663 | B2 | 1/2011 | Willis et al. |
| 7,962,458 | B2 | 6/2011 | Holenstein et al. |
| 8,126,848 | B2 | 2/2012 | Wagner |
| 8,161,005 | B1 | 4/2012 | Ozekinci et al. |
| 8,214,371 | B1* | 7/2012 | Ramesh ............ G06F 17/30241 707/743 |
| 8,315,636 | B2* | 11/2012 | Moon ................... G01S 5/0072 370/338 |
| 8,363,961 | B1* | 1/2013 | Avidan ................. G06K 9/6218 382/224 |
| 2003/0028530 | A1* | 2/2003 | Nagaraja ........... G06F 17/30952 |
| 2006/0235905 | A1 | 10/2006 | Kapur |
| 2008/0183730 | A1* | 7/2008 | Enga ................. G06F 17/30241 |
| 2008/0214156 | A1 | 9/2008 | Ramer et al. |
| 2009/0093261 | A1 | 4/2009 | Ziskind et al. |
| 2009/0138890 | A1 | 5/2009 | Blake et al. |
| 2009/0240744 | A1 | 9/2009 | Thomson et al. |
| 2010/0198791 | A1 | 8/2010 | Wu et al. |
| 2011/0225122 | A1 | 9/2011 | Denuit et al. |
| 2012/0166390 | A1 | 6/2012 | Merriman et al. |
| 2012/0226889 | A1 | 9/2012 | Merriman et al. |

OTHER PUBLICATIONS

"Chain Replication for Supporting High Throughput and Availability," by Robbert van Renesse and Fred B. Schneider, OSDI '04, pp. 91-104 of the Proceedings.

"Dynamo: Amazon's Highly Available Key-value Store," by Giuseppe DeCandia, Deniz Hastorun, Madan Jampani, Gunavardhan Kakulapati, Avinash Lakshman, Alex Pilchin, Swaminathan Sivasubramanian, Peter Vosshall and Werner Vogels, SOSP 2007, Oct. 2004, Stevenson, WA, USA.

"PNUTS: Yahoo!'s Hosted Data Serving Platform," by brian F. Cooper, Raghu Ramakrishnan, Utkarsh Srivastava, Adam Silberstein, Philip Bohannon, HansArno, Jacobsen, Nick Puz, Daniel Weaver and Ramana Yerneni, VLDB '08, Aug. 24-30, 2008, Auckland, New Zealand Copyright 2008 VLDB Endowment, ACM 000-0-00000-000-0/00/00.

Liang, S., et al. "GeoCENS: Geospatial Cyberinfrastructure for Environmental Sensing." Proceedings of GIScience 2010—Sixth international conference on Geographic Information Science. vol. 6292. Zurich, Switzerlanld: Springer, 2010.

* cited by examiner

SYSTEM AND METHOD FOR DETERMINING EXACT LOCATION RESULTS USING HASH ENCODING OF MULTI-DIMENSIONED DATA

RELATED APPLICATIONS

This application is a continuation of and claims priority under 35 U.S.C. §120 to U.S. patent application Ser. No. 13/037,969 entitled "SYSTEM AND METHOD FOR DETERMINING EXACT LOCATION RESULTS USING HASH ENCODING OF MULTI-DIMENSIONED DATA," filed Mar. 1, 2011, which is incorporated herein by reference in its entirety.

BACKGROUND

Conventional location-based services are currently available that permit end-users to access location-based information and refine navigation and/or query results based on using location-based information as part of query and/or navigation options. There are numerous problems associated with most conventional systems that limit implementation and/or require computationally expensive processing to respond to requests for location information. In some conventional approaches, all data points with location information need to be tested to determine whether a given data point meets, for example, a request for a list of the closest points to a user-entered location.

SUMMARY

In broad overview, aspects of the present invention are directed to geospatial indexing of data stored in database systems. Such database can be standalone databases or can be distributed (e.g. over multiple servers). A geospatial index, as used herein, refers to an index of multi-dimensioned location values represented in a single value format, e.g. a geohash value. The single index value permits respective locations, for example identified by a coordinate pair, to be assigned a single value that is generated to assign similar values to locations having similar distances from a given point. For example, adjacent locations are expected to return index values that are equal or nearly equal to each other. According to one embodiment, geospatial indexing improves system performance and reduces computational burden associated with location-based requests.

According to one implementation, to find points around some location of interest (e.g., identified by an X, Y coordinate pair), a computer system is provided that computes the hash value for the location. The computer system then calculates an identification boundary that surrounds the location of interest. The identification boundary is expanded until it exceeds the search area defined by the location of interest and a distance. Locations can be identified based on having associated hash values that fall within the identification boundary. In one example, each side of the identification boundary defines a range of hash values that are found within the area of the identification boundary.

According to one embodiment, the computer system computes the identification boundary based on the hash value for the location of interest. The system can compute larger and larger boundaries by generalizing the hash value of the point of interest (e.g. by replacing the low order bits with pad values). The system expands the identification boundary until some stopping condition occurs. Example stopping conditions can be thought of in geometric terms, once the area of the identification boundary exceeds the search area (defined by the location of interest and the distance) all candidate locations have been identified. Thus, according to another embodiment, hashing operations permits a system to reduce the geometric work (i.e. identifying locations in a search area) and processing required, by computing straightforward operations on hash quantities (e.g. searching a linear range of hashes), instead of, for example, point to point comparisons.

Further embodiments resolve issues associated with conventional indexing strategies. According to one aspect, systems and methods are provided for efficiently indexing and ordering spatially defined points in a multi-dimensioned space. In some embodiments, spatial ordering is configured to permit efficient computations on two dimensional data (e.g., latitude, longitude pairs) using a one dimensional index representative of, for example, a 2-D cartesian space. The spatial ordering can be referred to as "geospatial" and the hash values as "geohash" values, as the spatial ordering defines positions throughout the globe, and the ordering can be used to account for the impact of the curvature of Earth on distances by incorporating scaling factors into the calculation of geohash values. Geospatial indexing and ordering of the data permits the system to reduce the number of comparisons required in order to determine responses to location-based requests. In another example, a system request for the 10 closest points to an arbitrary location (e.g. a user-specified location on a map) can be optimized to consider a reduced number of point-to-point comparisons based on geospatial ordering of the two dimensional points. In some examples, the geospatial ordering is based on a transformation of the two-dimensional location values (e.g. a latitude and longitude pair) into single geospatial hash value.

Generally, spatially indexed data can be especially efficient in responding to request for information on items within a given distance from a point of interest. Conventional approaches are typically inefficient at establishing a spatial index. For example, known sequential and compound indexing strategies are typically inefficient as the set of points around a center comprise several discontinuous ranges in any enumeration of points under "dictionary" based ordering. Thus, conventional approaches may require a comparison of every point in the space against the point of interest to determine which points are closest.

According to one aspect of the present invention, a system for optimizing processing of location-based requests is provided. The system comprises at least one processor operatively connected to a memory, a hash component configured to generate a single dimension hash value from multi-dimension location inputs, an access component configured to access a given location for a point of interest and a distance threshold, wherein the given location and the distance threshold define a search area, an identification component configured to identify which locations associated with data in a database are within a distance from the point of interest, wherein the identification component is further configured to generate an identification boundary from a hash value of the given location, and wherein the identification component is further configured to identify locations within the distance from the point of interest based on the generated identification boundary. According to one embodiment of the present invention, the identification component is further configured to test whether the identification boundary, at least, intersects with an outer bound of the search area. According to another embodiment, the hash component is further configured to generate the single dimension hash value from a pair of location coordinates. According to another embodiment, the hash component is further configured to interleave bits representing a first location value and a second location value from the pair of location coordinates to generate the single dimension hash value.

According to one embodiment of the present invention, the hash component is further configured to reduce the first location value and the second location value by a respective minimum prior to generating the single dimension value. According to another embodiment, the hash component is further configured to scale the reduced first location value and the reduced second location value prior to generating the single dimension value. According to another embodiment, the hash component is further configured to round the reduced first location value and the reduced second location value to generate inputs to produce the output single value. According to another embodiment, the system further comprises a communication component configured to receive the given location. According to another embodiment, the identification component is further configured to capture a prefix portion of the hash value of the given location, generate an identification hash value, wherein the identification hash value includes the prefix portion, and compute dimensions of the identification boundary based, at least in part, on the length of the prefix.

According to one embodiment of the present invention, the hash component is further configured to invert the identification hash value to obtain identification boundary coordinates, and wherein the identification component is further configured to determine a position for the identification boundary based on the identification boundary coordinates. According to another embodiment, the identification component is further configured to determine that the dimensions of the identification boundary, at least, intersect with the outer bound of the search area, in order to determine that the identification boundary, at least, intersects with an outer bound of the search area. According to another embodiment, the identification component if further configured to calculate that a condition is true in order to determine the identification boundary at least intersects with an outer bound of the search area, wherein the condition is at least one of: an abscissa of a lower left corner of the identification boundary is less than the abscissa of the search area's center minus the distance threshold; the abscissa an of upper-right corner of the identification boundary is greater than an abscissa of the search area's center plus the distance threshold; the ordinate of a lower-left corner of the identification boundary is less than an ordinate of the search area's center minus the distance threshold; and an ordinate of an upper-right corner of the identification boundary is greater than the ordinate search area's center plus the distance threshold.

According to one embodiment of the present invention, the system further comprises a determination component configured to determine which locations associated with data in a database are within the identification boundary, based on a respective hash value for a respective location associated with data in the database. According to another embodiment, the determination component is further configured to determine the respective hash value for the respective location is with a range defined by the identification boundary. According to another embodiment, the range defined by the identification boundary is determined based on a prefix portion of the hash value for the given location. According to another embodiment, the system further comprises a confirmation component configure to determine that a location determined to be within the identification boundary based on the respective hash value, is within the search area using location values corresponding to the respective hash value. According to another embodiment, the confirmation component is configured to obtain the location values corresponding to the respective hash values based on at least one of a lookup in the database and an inversion of the respective hash value to obtain a location pair.

According to one aspect of the present invention, a computer implemented method for optimizing processing of location-based requests is provided. The method comprises acts of accessing, by a computer system, multi-dimensioned location information associated with data in a database, transforming, by the computer system, the multi-dimensioned location information into a single dimension hash values representative of a spatial distance, and identifying, by the computer system, data in the database having a location within a distance from a point of interest, wherein the act of identifying includes generating an identification boundary from a hash value of the point of interest and identifying locations within distance from the point of interest based on the generated identification boundary. According to one embodiment of the present invention, the method further comprises an act of determining, by the computer system, that the identification boundary, at least, intersects with an outer bound of a search area defined by the point of interest and a distance threshold.

According to another embodiment, the method further comprises an act of expanding the identification boundary until the identification boundary, at least, intersects with an outer bound of a search area defined by the point of interest and a distance threshold. According to another embodiment, the act of generating an identification boundary from a hash value of the point of interest includes capturing a prefix portion of the hash value of the given location, generating an identification hash value including the prefix portion which corresponds to an identification boundary with dimensions based, at least in part, on the length of the prefix.

According to one embodiment of the present invention, the method further comprises acts of inverting the identification hash value to obtain identification boundary coordinates; and establishing the identification boundary on the identification boundary coordinates. According to another embodiment, the act of identifying, by the computer system, data in the database having a location within a distance from a point of interest, includes determining which locations associated with data in a database are within the identification boundary, based on a respective hash value for a respective location. According to another embodiment, the act of determining includes determining the respective hash value for the respective location is with a range defined by the identification boundary. According to another embodiment, the method further comprises an act of determining the range based on a prefix portion of the hash value for the given location. According to another embodiment, the act of identifying includes an act of comparing respective location values corresponding to the respective hash value to the given location to determine the respective location values are within the search area, wherein the respective location values are determined to be within the identification boundary based on the respective hash value. According to another embodiment, the act of comparing includes an act of obtaining the location values corresponding to the respective hash values based on at least one of a lookup in the database and an inversion of the respective hash value to obtain a location pair.

According to one aspect of the present invention, provided is a non-transitory computer-readable medium having computer-readable instructions stored thereon that, as a result of being executed by a computer, instruct the computer to perform a method for optimizing processing of location-based requests. The method comprises acts of accessing multi-dimensioned location information associated with data in a database, transforming the multi-dimensioned location information into a single dimension hash values representative of a spatial distance; and identifying data in the database having a location within a distance from a point of interest, wherein the act of identifying includes generating an identification boundary from a hash value of the point of interest, and identifying locations within the distance from the point of interest based on the generated identification boundary.

According to one embodiment of the present invention, the method further comprises an act of determining, by the computer system, that the identification boundary, at least, intersects with an outer bound of a search area defined by the point of interest and a distance threshold. According to another embodiment, the method further comprises an act of expanding the identification boundary until the identification boundary, at least, intersects with an outer bound of a search area defined by the point of interest and a distance threshold. According to another embodiment, the act of generating an identification boundary from a hash value of the point of interest includes capturing a prefix portion of the hash value of the given location, generating an identification hash value including the prefix portion which corresponds to an identification boundary with dimensions based, at least in part, on the length of the prefix.

According to one embodiment of the present invention, the method further comprises acts of inverting the identification hash value to obtain identification boundary coordinates; and establishing the identification boundary on the identification boundary coordinates. According to another embodiment, the act of identifying, by the computer system, data in the database having a location within a distance from a point of interest, includes determining which locations associated with data in a database are within the identification boundary, based on a respective hash value for a respective location. According to another embodiment, the act of determining includes determining the respective hash value for the respective location is with a range defined by the identification boundary. According to another embodiment, the method further comprises an act of determining the range based on a prefix portion of the hash value for the given location. According to another embodiment, the act of identifying includes an act of comparing respective location values corresponding to the respective hash value to the given location to determine the respective location values are within the search area, wherein the respective location values are determined to be within the identification boundary based on the respective hash value. According to another embodiment, the act of comparing includes an act of obtaining the location values corresponding to the respective hash values based on at least one of a lookup in the database and an inversion of the respective hash value to obtain a location pair.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

According to one embodiment, provided is a distributed database system configured to geospatially index stored data. In one example, the data is indexed based on geohashing of the underlying data to provide for efficient access of location information associated with the data stored in the distributed database. The geohashing of the location data for a respective record, document, or other data storage unit containing and/or associated with location information, provides a single dimensioned value that is representative of the multi-dimensional spatial information, for example a latitude and longitude pair. Any discrete data element in a database with associated location information can have an associated geohash value for the data element. Data unit is intended to describe the various formats of individual data records, data entities, document based records, etc. that can be used in database systems, whether they are relational databases, hierarchical, network based, file based, etc.

The resulting geohash value provides for efficient indexing and ordering, as locations with similar geohash values are characterized by having a similar distance from a given point. The system uses the geospatial index and/or ordering to select locations for further evaluation, which allows the system to automatically reduce the number of locations that the system needs analyze to return a location-based result.

According to some embodiments, the system uses an index based on geohash value as a course filter to limit the computations performed on actual location values of specific data entries. Further processing on the data units (for example, data records, documents, or other data storage unit) associated with geohash values in the identified ranges, can include further processing and/or processing by additional systems to return contextual location-based information associated with the underlying data. The contextual location-based information analysis can be performed in addition to the base determination of data having a location nearest or within a given distance from a point of interest.

Figure 1:
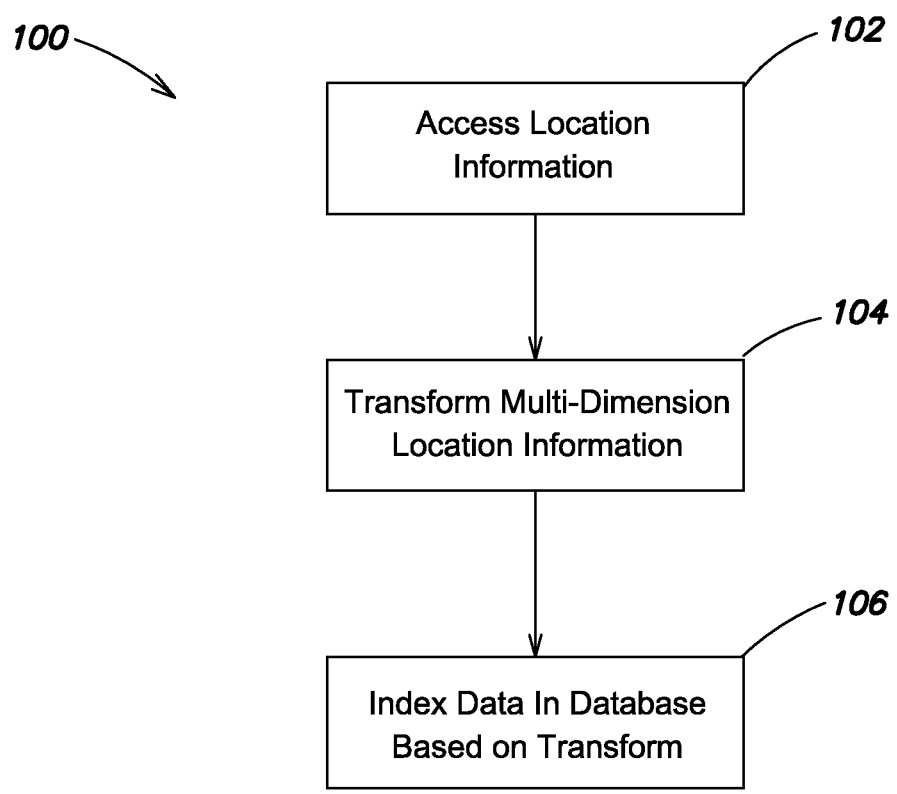
FIG. 1 illustrates a flow for an example process for organizing a database using location information, according to one aspect of the present invention.

Shown in FIG. 1, is an example process that can be executed on a system for responding to location-based requests, and/or systems for optimizing processing of location-based requests. Process 100 illustrates an example flow for organizing a database using location information. At 102 location information for any individual records, documents, and/or data units stored in a database, can be accessed to retrieve location information. In some examples, location information can be received from other processes and accessed to transform the multi-dimensioned location information into a single dimension value at 104. In some examples, a database record can include latitude and longitude values stored as values of attributes in a column or row of a database. In other examples, a database can employ documents as a storage unit and location information can be retrieved from the document for transformation. In still other examples, relations can be defined between data that permits retrieval of location information. Further, some databases can define entities with associated location information. Various implementation are configured to access the various data types regardless of the nature of the storage unit for the database.

Figure 2:
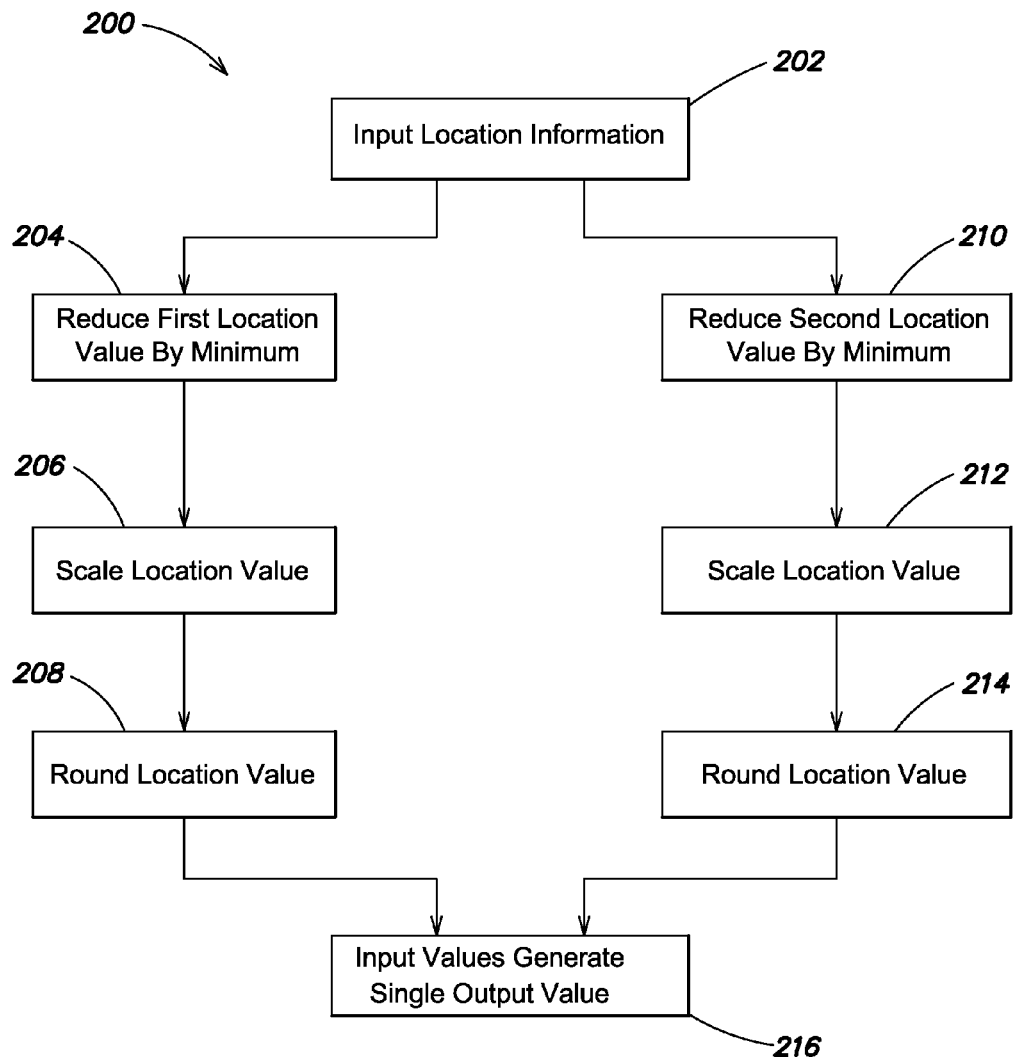
FIG. 2 illustrates a flow for an example process for transforming multi-dimension location information, according to one aspect of the present invention.

In one embodiment, the location information associated with a data unit stored in a database includes a coordinate pair reflective of a location. In one example, the coordinate pair includes longitude and latitude values for the location. At 104, the multi-dimensioned location information can be transformed into a single dimensioned value. In some embodiments, multi-dimensional values are used as inputs for a function that generates a single value output. Step 104 can be executed as a separate process, for example, as shown in FIG. 2 for transforming location information. In some embodiments, a system for responding to location-based requests, and/or systems for optimizing processing of location-based requests can execute a separate process, e.g., 200, to transform location information. In other embodiments, no separate processing is required. At 104, individual values are generated through the transformation step that are reflective of a distance the location information had from an origin point. The origin point can be stored by the system as a default and/or dynamically determined.

The determination of an origin point to use in the transformation can occur as part of process 100, and/or can be established before executing process 100. In some examples, a system for responding to location-based requests, and/or systems for optimizing processing of location-based requests can receive values for the origin point to use for transformation of location information. For example, the information defining the origin point can be delivered with a location-based request. In some embodiments, an origin point can be defined that permits indexing of any location upon the Earth. In one embodiment, the origin point reflects the minimum value for each of the coordinate pairs. Represented geographically, in one embodiment, a box can be drawn around the Earth so that any location can be represented within the box. The bottom left most point of the box can be used as the origin regardless of the values assigned to the point or any of the locations within the box.

In other embodiments, smaller boundaries can be employed. Localized boundaries, for example within a country, landmass, or other geographic aspect, can be employed with some origin point in each representing a minimum for the location information contained therein. The preceding description implies, a boundary geometrically similar to a box (e.g., rectangle and/or square) but in some embodiments, different boundary shapes can be used as well. In some examples, natural boundaries, and/or cartographic boundaries could be employed to establish an origin point against which to compare location information. Arbitrary boundaries based on a given location can also be employed. According to some embodiments, use of localized boundaries can include a risk that a location-based request falls outside of a defined boundary. Thus, in some embodiments, a selected boundary can tested to insure coverage.

In other embodiments, other systems can be configured to store data with different boundaries, and the identification of the data within a given distance from an arbitrary point can include combining the results of multiple systems. In some embodiments, multiple systems can host different data with each having a different boundary, or in one alternative the same data can be hosted on different systems, and the systems can include different boundaries for the same information.

In other embodiments, location-based requests can be constrained to occur within a given area to prevent an out of bounds location request. In one example, a system can be configured to limit responses to the constrained area. For example a user can be instructed in a user interface that the search encompasses a given area. In another example, a system can be configured to render a map in a user interface. The area of the displayed map can be employed as a boundary. In some embodiments, the system can be configured to change a boundary and/or dynamically determine the boundary. In one example, the boundary can be changed based on a user changing the position of the displayed map. In some embodiments, multiple origin points can be employed to generate more than one set of transformed values on which to index the underlying data units (e.g., data records, documents, data entities, data relations, etc.).

For example, at step 106, any unit of data stored in a respective database can be indexed based on the transformation of the respective unit's location information. According to one embodiment, conventional address listings contained within data in the database can be used. In one example, coordinate locations for a conventional address are retrieved by querying an external system. According to one embodiment, the transformation function generates outputs assigning similar values for the location information that is relatively close in sharing a distance from the origin point. According to one example, similar in the sense of the output of the transformation function can refer to a point having a location (e.g., $x_1$, $y_1$ coordinates) that is close to another location (e.g., $x_2$, $y_2$). The resulting output of the transformation function will converge to equal values for the points defined by $x_1$, $y_1$ and $x_2$, $y_2$ as those locations converge towards the same location or the values for $x_1$, $y_1$ and $x_2$, $y_2$ become equal. For some embodiments, the transformation function interleaves bits of the x and y value, thus similar values can be viewed as varying in some of the low order bits of the x and y components. In other examples, similar values can be evaluated based on a threshold difference, or can be determined to be within a threshold range of values.

In some embodiments, the transformation step includes a hash function that generates a hash value from coordinate location inputs. Such hash values can also be determined to be similar upon review of their integer representation rather than upon review of their matching bits. Generated hash values of similar cardinality represent locations that are close together. This property is discussed in greater detail below (for example, with respect to processes 300, 400, and 600) with respect to location boundaries drawn around a center point based on hash values that fall within a given area around the center.

Data units indexed on the transformed location information, including for example a geohash value, can be used in further processing for limiting location comparisons that may be required to respond to location-based requests. In some embodiments, the index generated at 106 can be stored in the database for subsequent access. In other embodiments, the index can be retained in cached memory for use in determining a subset of data units that need to be evaluated against a specific location-based request. In some examples, the index can be dynamically generated in response to each location-based request. In some examples, multiple systems can be employed. A first system can be used to create a geospatial index. The geospatial index can then be used by other systems to determine data units that need to be evaluated to respond to a location-based request. In other embodiments, the indexing and the evaluation functions can be performed by one or more systems that index and evaluate data units based on the index information.

In some embodiments, process 100 can be executed to first index location values and the index can then be employed to limit the number of location comparisons that are required to respond to a location-based request. For example, process 300, FIG. 3, can be employed by a computer system to reduce the number of distance computations necessary to generate a set of results filtered on the spatial index. Various transformations can be employed to generate spatial index values, e.g., geohash values, for example as part of process 100 at step 104 to achieve a single value representative of a distance from an origin.

Referring again to FIG. 2, process 200 illustrates an example process for transforming multi-dimension location information. At 202, the process uses location information associated with a data unit as an input. In some embodiments, each data unit in the database includes latitude and longitude values for the data unit. For locations defined by a coordinate pair, the first location value can be reduced by a minimum value for that location value at 204. In an x,y coordinate set, the first value is reduced by the minimum possible value for x. The minimum values for x and y correspond to an origin for the set of location values defined by the possible values for x and y. The minimum values for x and y can be defined in advance, dynamically determined, and/or supplied with a location-based request. Step 204 can be omitted in some embodiments. For example, for a set of locations with an origin of 0,0 and all location values being greater than 0,0, no reduction by a minimum value is required. At 206, the first location value is scaled. The scaling factor can be used to improve precision in the computation of the output transformation value. A floating point number can be used to represent the value of the first location value.

Subsequent operations in process 200 use integer values to transform the location information. Thus, scaling a number having decimal values permits greater precision by converting the floating point number into an integer based representation to any desired degree of precision. Scaling by 10000, for example, moves the decimal place four places. Scaling can include multiple factors to determine the final scaling value. According to some embodiments, the first factor in the scaling value can be a parameter of the geoindex and a second factor is a large positive constant used to magnify floating point numbers prior to subsequent rounding steps. According to one embodiment, the parameter of the geoindex can be used to correct for the effect on distances that results from the curvature of the Earth. According to other embodiments, the larger the second factor the greater the amount of data that is retained after rounding.

Rounding the first location value at 208 converts the floating point number into an integer that can be used as a first input of two into a function for outputting individual values. At step 210, the second location value is reduced by a minimum value. In one example, where distance information is defined by an x,y coordinate the y values is reduce by its minimum value. The second location value is scaled at 212 and rounded to an integer at 214. At 216, both location values have been processed for input to the output operation. Output operation at 216 employs both location values as inputs and generates a single dimension output value. In some embodiments, an invertible hash function can be used to receive integer inputs of the first and second location values to output a "geohash" value of the location information at 216. In one example, at 216 the output operation interleaves the bits of the input values. Process 200 is illustrated having branched operations on location values, however, the ordering and the number of steps employed can be varied in other embodiments. In some examples, the branches can be combined permitting similar operations on the location values to occur at the same time. In other examples, the process can occur sequentially, and in yet others, steps can be combined and/or omitted.

Process 200 illustrates one example of a transformation process to output a geohash value based on input location information. Geohash values can be determined for each data unit in the database and used to index all the data units stored in the database. In one embodiment, a transformation process can be represented by various functions. In one example, a transformation function is defined by the following equation:

$$H(x,y)=M(\text{round}((x-\min)\times \text{scale}),\text{round}((y-\min)\times \text{scale}))$$

Where x,y defines a location in a set of location values wherein: the set can be a square in a 2-dimensional Cartesian space; min can be the lower left corner of the set boundary (minimum values for x, minimum value for y) of a virtual box containing all the location values; scale can be a positive scaling value; and round can be a function that rounds real numbers to integers. M is an invertible hash function that can accept integer inputs. According to one example, the invertible hash function generates an output based on the following properties:

c is generated from inputs a, b such that:

$$\frac{\text{rem}(c, 2^{2n+1})}{2^{2n}} \geq 1 \text{ iff } \frac{\text{rem}(a, 2^{n+1})}{2^n} \geq 1, \text{ and}$$

$$\frac{\text{rem}(c, 2^{2(n+1)+1})}{2^{2(n+1)}} \geq 1 \text{ iff } \frac{\text{rem}(b, 2^{n+1})}{2^n} \geq 1 \text{ for all } n > 0.$$

In the above example, function M is invertible, however the rounding involved in the original location values for x and y does not typically allow for strict inversion. In cases where scale is sufficiently large, the quantity lost due to rounding will be correspondingly small. Consequently, a practical approximate inverse of H, called U (for "unhashing"), is given by:

$$U(c) = \left( \frac{X(M^{-1}(c))}{\text{scale}} + \min, \frac{Y(M^{-1}(c))}{\text{scale}} + \min \right)$$

where scale, and min are defined as above, $M^{-1}$ is the inverse of M and X(p) and Y(p) are the abscissa and ordinate of point p, respectively. The transformation function can be used to derive a "geohash" value for a location. The operation performed to output a single representative value, as discussed herein, may be referred to as a transformation function and in the alternative a "geohashing" function.

In one example, some properties of a geohashing function include:
given a point, p with a geohash value h—define a prefix, P, of h with magnitude L using:
P(h,L)=a such that:

$$\frac{\text{rem}(a, 2^{n+1})}{2^n} \geq 1 \text{ iff } \frac{\text{rem}(h, 2^{n+1})}{2^n} \geq 1 \text{ for } n \geq 2L \text{ and } \text{mod}(a, 2^{2L}) = 0.$$

(i.e. h and a agree on all bits up from 2 L, and the bits of a are zero from 0 to 2 L)
Where L=0, a=h (trivial case)
As the 2 L least-order bits of a are all zero, the L low-order bits of $X(M^{-1}(a))$ and $Y(M^{-1}(a))$ are zero as well.
Given a positive scale and min values that are negative, each coordinate of c=U(a) will be less than the corresponding coordinate of p.

Processes 100 and 200 can be implemented on a variety of computer systems. For example, a general purpose computer system 900, shown in FIG. 9, can be specially programmed to execute processes 100 or 200, or other processes for organizing a database to generate a geospatial index. Further, system 900 can be programmed to execute a number of functions to generate geohash values for location information on which to index data. System 900 can be used in conjunction with other general purpose computer systems specially configured to perform geospatial operations. In some settings, other general purpose computer system can be configured to use the index information generated in, for example, process 100, to identify candidate data units stored in a database based on a spatial index.

Comparing locations to determine if they fall within a given distance from a point of interest is an expensive operation, in large part based on the number of calculations required. A geospatial index of one dimension allows filtering of multi-dimensioned location values quickly and efficiently, so that actual comparisons between locations and the given distance from the point of interest can be reduced by a system (e.g., 900) to a subset of the locations associated/stored with the data units in a given database.

Hash values can be used to quickly and efficiently identify candidate data units that can then be further analyzed with greater precision. For example, the location information associated with candidate data units can be examined to determine which data points would satisfy a location-based query, for instance, which three points are closest to a user supplied location. In other settings, a system, e.g., 900, can be configured to perform both indexing operations and the functions for identifying candidate data units. Further the same system can also be configured to respond to the location-based query after performing any necessary distance evaluations. In some settings, functions can be implemented across multiple machines, with individual or multiple systems performing the indexing operations, which in turn enable other system(s) to perform filtering operations, which can pass candidate locations information to systems configured to perform distance evaluations on the individual candidate data units identified.

Figure 3:
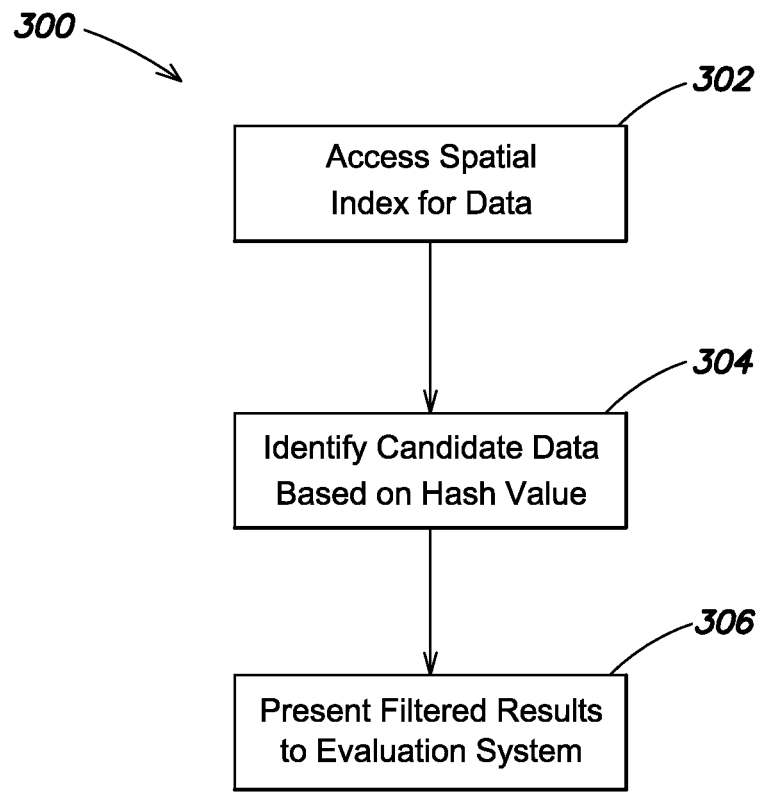
FIG. 3 illustrates a flow for an example process for filtering data based on a geospatial index, according to one aspect of the present invention.

Shown in FIG. 3 is an example process 300, for filtering data units (e.g., data records, documents, data entities, data relations, etc.) stored in a database based on a geospatial index. At 302, a spatial index for the data units stored in a database is accessed. The spatial index groups like data units so that candidate data units can be quickly and efficiently identified at 304. According to one embodiment, like data units refers to data units having location information that is similar in distance to a given origin. The spatial index is generated from hash values of any location information associated with a data unit. In one embodiment, each data unit in the database includes longitude and latitude information for the data unit. The hash value of the longitude and latitude information will converge towards equal as the longitude and latitude values for the locations become equal. Thus, the index groups locations having a similar distance property, and in some examples, the similar distance property is represented by having a similar distance from an origin.

Having the geospatial index allows for quick and efficient identification of candidate locations that are approximately the same for the purpose of identifying which locations need detailed analysis to determined if they meet a given distance requirement. In some examples, the given distance requirement is provided as part of a location-based query entered by a user and communicated to a system configured to identify candidate locations. The given distance can be used to identify a boundary for the geohash values. The boundary for the geohash values will correspond to locations to evaluate to precisely determine if the location is actually within the given distance requirement.

According to some embodiments, various boundary operations can be employed to determine if a threshold hash value falls within a boundary. In one example, a virtual box can be drawn to describe the geohash values that fall within a given area of the virtual box. The virtual box can be expanded until its area meets or exceeds an area defined by a given location and a distance requirement. Once a virtual box of sufficient area is rendered, candidate locations are identified, for example at 304.

According to one embodiment, the area of the virtual box defines a filtered set of candidate locations. The candidate locations can then be further analyzed to determine which of the candidate locations actually fall within a given distance from a point of interest. For example, at step 306 a set of filtered data units can be communicated to a system configured to perform distance evaluations on the filtered data units. The filtered data units can be referred to as candidate data units as the rough calculation using the geospatial index identifies locations having geohash values that are within a threshold for the geohash values, but do not necessarily have locations that are within the given distance requirement. According to one embodiment, further analysis is required to determine with precision whether a given candidate location actually falls within the given distance requirement. In some examples, the underlying locations for each data unit having a hash value within the virtual box is compared to a point of interest to determine if each of the underlying locations is actually within the distance requirement (i.e. is a location within x distance from the point of interest).

Figure 4:
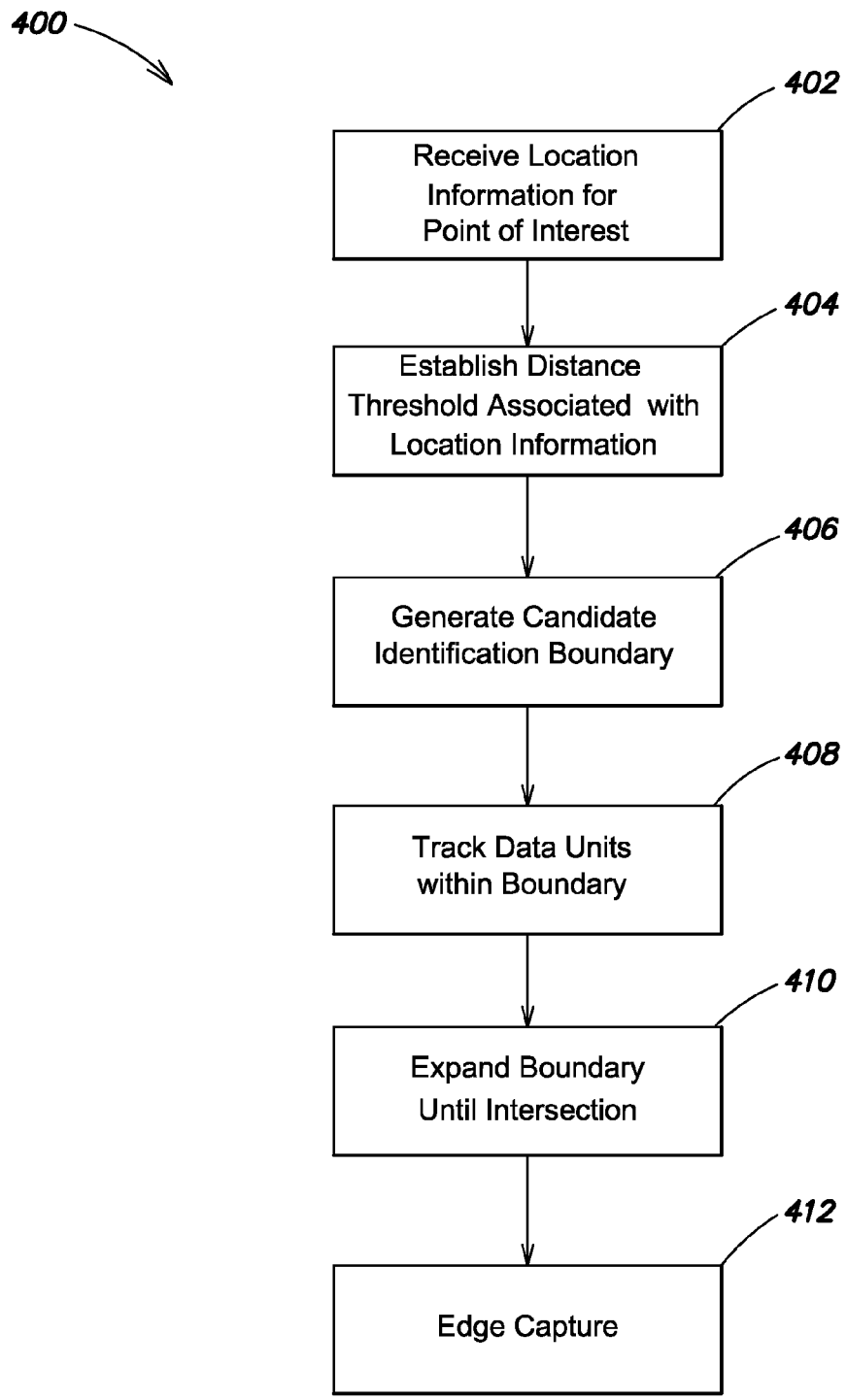
FIG. 4 illustrates a flow for an example process for identifying candidate data units based on a spatial index, according to one aspect of the present invention.

Shown in FIG. 4, is an example process 400, for identifying candidate data units based on a spatial index. In some embodiments, various systems can be specially configured to execute process 400, for example system 900. In other embodiments, systems can be configured to execute other processes for identifying candidate data units within a database based on a geospatial index. At 402, location information is received, identifying a point of interest. At 404, a distance threshold associated with the location information is computed. In some embodiments, the distance threshold can be received with the location information. In other embodiments, a default value can be used for the distance threshold, and in others profile information can be employed to determine a distance threshold. Further, requests for the closest locations to a given point can also be optimized by use of hashed location values. In one example, identification boundaries can be drawn around the given point, for example, based on its hash value, and a number of data units having hash values within the boundary can be determined. The boundary can be expanded until the determined number of data units having hash values equals or exceeds the number of closest points.

In one example, a user entering a location-based query defines a point of interest and a distance from the point of interest as part of a location-based request. In one setting, the user can identify in a user interface displayed on a host computer system the user's location and the user can further specify a distance from that location in which the user wishes to receive information. In some embodiments, the user can enter a variety of information associated with the location-based request, which can be used in conjunction with location information to further refine/identify data units of interest. By presenting a location-based request to identify all coffee shops within 0.1 miles of the present location, a user presents additional refinements beyond determining which data records have locations within 0.1 miles of the user's location. Such additional refinements can be processed during identification of candidate locations, after identification of candidate locations, and/or in conjunction with identification of candidate locations. Further refinements can also be presented, including for example, find all coffee shops within 0.1 miles with a five star rating.

At 406, a candidate identification boundary is generated which defines an area including the geohash values that are within the computed distance threshold. Process 400, tracks which data units have hash values within the candidate identification boundary, for example, at 408. According to some embodiments, the relationship between the distance threshold and the identification boundary can be thought of generally in geometric terms. The distance threshold can be represented as a circle around the point of interest having a radius of the given distance, and the candidate identification boundary represented by a virtual box of a given area. Each hash value within the virtual box correlates to a location for a data unit, wherein the data unit's location is within a certain distance from an origin as identified by the hash value.

According to one example, generation of the candidate identification boundary at 406 includes calculating a hash value for the given location. The hash value for the given location can be used to establish the candidate identification boundary. According to one embodiment, an expanded hash value is generated that matches the hash value for the given location to a desired degree. Typically low order bits of the expanded hash value are replaced with zeros. According to one example, the number of replaced zeros controls the size of the initial candidate identification boundary. The matching portions of expanded hash value and the hash for the given location can be referred to as the prefix for the hash values.

According to one embodiment, the area described by the candidate identification boundary can include a rectangle whose sides are $1/(2^{(B-N)})$*the length of the corresponding side of the location space being analyzed. In one example, where a side of the rectangle is being drawn in an x coordinate range, the corresponding side is the length of the x coordinate space in the entire mapped location boundary. In some examples, this can encompass all of the longitude values that are mapped. According to one embodiment, the lower left corner of the rectangle corresponds to the "unhashed" values of the expanded hash. In one example, the equation described above U(c) provides a coordinate location for the lower left corner of the virtual rectangle.

At 410, the candidate identification boundary is expanded until the candidate identification boundary intersects with the distance threshold. To continue the geometric metaphor, the area of the virtual box for the candidate identification boundary can be expanded until the area of the box intersects the circumference of a circle defining the distance threshold, (i.e., a circle centered on the given location with a radius equal to a given distance). In some embodiments, the candidate identification boundary comprises different shapes, and in some embodiments, the geometric metaphor does not apply as the candidate identification boundary does not conform to a convenient geometric shape.

In one example, expansion of the candidate identification boundary occurs by decreasing the number of matching bits in the expanded hash value. According to another example, by reducing the prefix of the hash and replacing its low order bits with zeros the area of a candidate identification boundary is expanded. In some embodiments, the candidate identification boundary is expanded by doubling the area the boundary describes. Although according to other embodiments, the increase of the candidate identification boundary can be done using other factors.

In some embodiments, a computation to determine intersection of the distance threshold and the candidate identification boundary has occurred is not necessary, rather, a more inclusive operation can be used, for example, one that determines that the candidate identification boundary encompasses all the points defined by the distance threshold. Various computations can determine when the candidate identification boundary exceeds the area defined by the given location and distance threshold. In some examples, computations can be performed by a computer system to determine a candidate identification boundary encompasses the search area when any one or more of the following conditions are met:

(a) the abscissa (X-coordinate) of lower-left corner of the box is lower than the abscissa of the circle's center minus the radius,
(b) the abscissa of upper-right corner of the box is greater than the abscissa circle's center plus the radius,
(c) the ordinate (Y-coordinate) of lower-left corner of the box is lower than the ordinate of the circle's center minus the radius,
(d) the ordinate of upper-right corner of the box is greater than the ordinate circle's center plus the radius Step 408 can be repeated every time the candidate identification boundary is expanded, alternatively step 408 can be executed once after the final candidate identification boundary is established, and in other embodiments step 408 can be persistent and/or continuous ending only when all candidates have been identified. One should appreciate that although process 400 is illustrated in a linear progression, the ordering of the steps can be changed, and in some embodiments, steps can be omitted and/or joined into fewer steps.

At 412, an optional edge capture process can be used to identify candidate data units that are outside of the boundary established in step 410. Additional virtual boxes can be defined to identify candidate data units which have hash values that fall outside of the boundary. Using the geometric metaphor, when the box defining the candidate identification boundary intersects the circle defining the distance threshold, the box may not cover the entire area defined by the circle. Edge capture step 412, includes use of additional candidate identification boundaries to insure capture of the areas defined by the circle that fall outside of the intersecting box. In one example, four additional candidate identification boundaries are computed, corresponding to new virtual boxes on each edge of the original virtual box that corresponds to the original candidate identification boundary. Multiple additional boundaries can be defined during step 412 to capture edge positions. As previously described, the additional boundaries do not need to correspond to geometric shapes. Again step 408, can be re-executed once all edge candidate data units are identified, or alternatively step 408 can be executed once all candidate identification boundaries are computed including any edge boundaries. In one example, step 412 can be omitted where the candidate identification boundary is computed to exceed the area defined by the given location and the distance threshold. Process 400 illustrates just one example process for filtering data units by a geospatial index. Other processes can be employed including sub-processes used in conjunction and/or instead of process 400.

Process 400 can include other processes, and for example, can execute various sub-processes for generating a candidate identification boundary. Generally stated, an object, according to some embodiments, of generating a geohash value of location information includes creating values where if two points' geohashes' most significant bits agree, then applying the geometric metaphor, both locations are inside a box whose lower-left corner can be computed from the unhash (e.g., U(c)) of the geohash value derived from the longest sequence of common most significant bits. In some embodiments, the sequence of the common most significant bits is padded with some number of zeros to generate a complete geohash value that can be transformed via an unhashing function into location coordinates. According to one example, given a geohash H that ends in even number of zeros (of length 2N), a computer system can construct a rectangle whose sides are $1/(2^{(B-N)})$ the length of the corresponding side of the location space (where B is the number of bits used to encode hash values of points in the location space—in various embodiments additional bits can be used in the generated hash value to permit finer granularity) and whose lower-left corner is the unhash of H (e.g. U(c)). In one example, where a side of the rectangle is being drawn in an y coordinate range, the corresponding side is the length of the y coordinate space in the entire mapped location boundary. In some examples, this can encompass all of the latitude values that are mapped. According to some embodiments, the generated rectangle is an approximation, that represents a good fit until the unhash of H is approaches an edge of the location space.

Additional processing can be employed for situations when the unhash of H is close to an edge of the location space. In some examples, the additional processing includes rendering a box of smaller area and additional edge capture processing. In other embodiments, a broader location space S can be used such that the generated boundary does not approach an edge of the location space.

Figure 6:
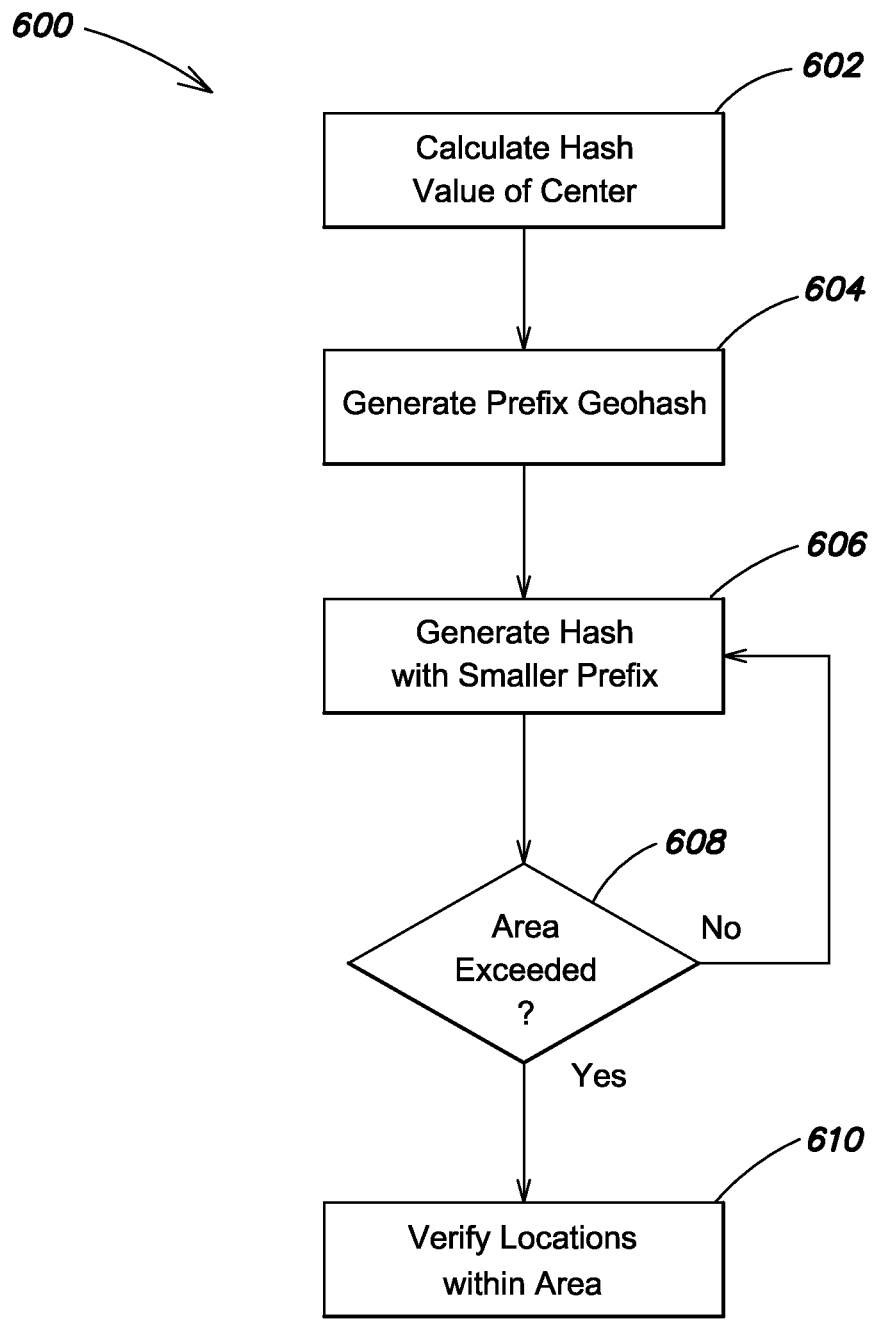
FIG. 6 is an example process flow for identifying candidate location-based on a spatial index, according to one aspect of the present invention.

Shown in FIG. 6, is an example process 600 to find location points close a given location within a given location space. The given location is set as center point C. At 602, a geohash of C is computed. At 604, successive "prefix" geohashes are generated whose M most significant bits agree with G(C) and whose least significant bits are all zeroes. "Prefix" geohashes correspond to box drawn around the center point. At 606, hashes with smaller prefixes are generated as needed. Each successive "prefix" agrees with fewer bits than its predecessor (i.e., M goes down), which correspond to larger and larger boxes drawn around the center point. These successive "prefix" geohashes, which correspond to bigger and bigger boxes in the location space, are integers. Given geohash P with M bits of precision, the range of integers from P up to $P+(2^{(2(B-M))}-1)$ will reflect the geohashes of points inside the rectangle that corresponds to P.

A geospatial indexing system can generate boxes wherein all the points in the box corresponding to P, and have geohashes in the range [P . . . $P+(2^{(2(B-M))}-1)$]. Since integers are readily indexed (e.g., with B-Trees), points in the space defined by the integer hash values can be easily indexed using B-Trees.

Figure 7A:
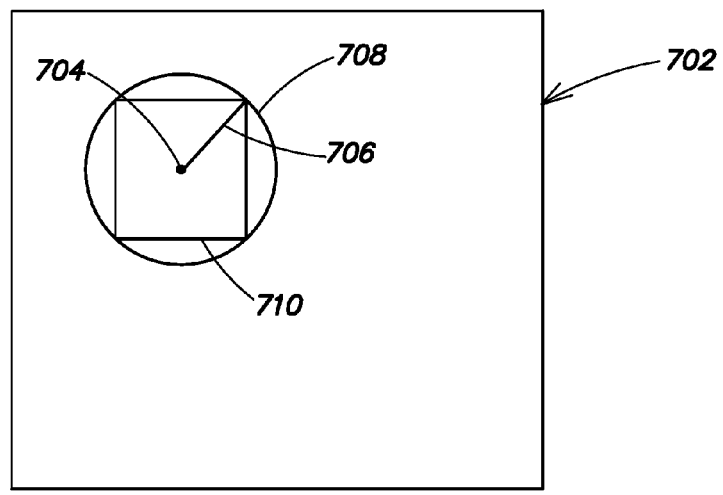
FIGS. 7A-B are illustrations of a virtual representation of identification boundaries, according to one aspect of the invention.
Figure 7B:
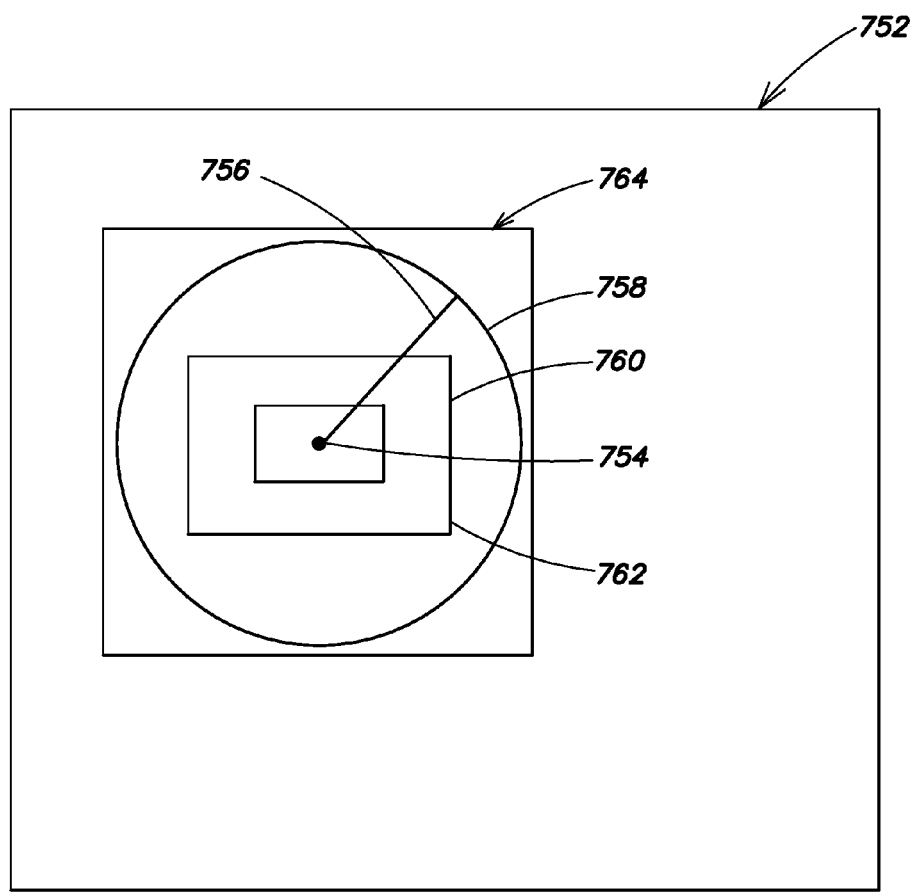

Shown in FIG. 7B, is an example location space S rendered as a 2-dimensions cartesian space 752. A center point is defined at 754 with a distance 756 that defines circle 758. As discussed with respect to process 600, FIG. 6, a geohash in calculated from 754 and a prefix hash value is generated based on the geohash of the center point. The first prefix hash corresponds to rectangle 760. The system can be configured to determine that the area of 760 does not exceed the area of 758. In some embodiments, a computation can be performed to determine if the rectangle 760 intersects 758. A second prefix hash value can be generated with fewer agreeing bits that corresponds to rectangle 762. Again computations can be performed to determine if the area of the circle 758 is exceeded or in other embodiments, if the rectangle 762 intersects with the circumference of the circle 758. If the neither operation returns true, at third prefix hash with even fewer agreeing bits can be generated. The third prefix hash corresponds to rectangle 764, which is illustrated as exceeding the area of the circle.

Figure 8:
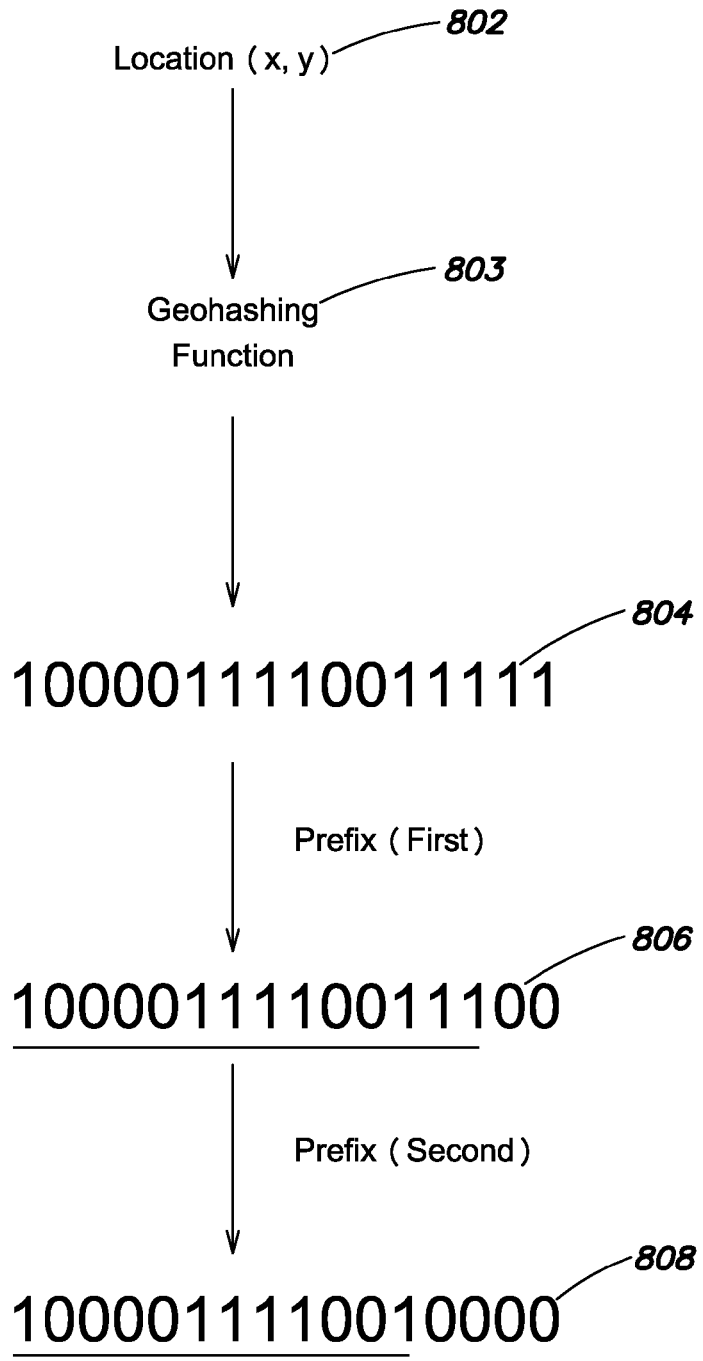
FIG. 8 is an illustration of an example of a geohash value and examples of geohash prefixes, according to some aspects of the present invention.

FIG. 8 illustrates a simplified example of a geohash value 804 comprising 16 bits. A location x,y, 802, is processed through a geohashing function 803 to generate the geohash value 804. From 804, a first prefix can be generated, 806, which replaces the last two bits of the geohash values 804 with zeros. Underlined in 806 are the matching bits between 804 and 806. As discussed, the prefix hash corresponds to a boundary, in some examples, a rectangle. When the boundary is not sufficient additional prefix values are generated, for example, 808. Underlined in 808 are the matching bits between 804 and 808. As discussed, the second prefix hash corresponds to a boundary having a greater area than the boundary corresponding to 806. Larger and larger boundaries can be generated until a stop condition is met.

Returning to FIG. 6, according to one embodiment, given the computed G(C)—geohash of C—from 602 and then successive prefixes P1, P2 ... PN corresponding to larger and larger rectangles from 606, the search for points inside a bounding circle with center C and radius R includes a determination at 608 YES that a prefix Px corresponds to a rectangle whose edges fall entirely outside the circle. At 608 YES, it is determined that the area described by the center point and the given distance has been exceeded by the area of the corresponding rectangle. Once the rectangle exceeds the area of the circle, all closest locations are described by the box generated from prefix Px. Step 606 is repeated when at 608 NO, a determination is made that the rectangle does not exceed the area defined by center and given distance.

Once the rectangle exceeds the area of the circle 608 YES, all those geohashes in the index that occur within the range of geohashes up from Px up to Px+(2^(2(B−M))−1), can be checked to confirm that the corresponding locations are actually within the area of the circle, for example at optional step 610. Step 610 is optional as other systems and/or other processes can be used to perform additional analysis once candidate location points have been identified. In some embodiments, for each geohash identified an unhash operation can be performed to obtain an approximate coordinate pair, which can be checked to determine if the coordinate pair is inside the circle. According to other embodiments, the hash value can be used to retrieve a corresponding location stored as part of a data unit in the database and the stored location values can be evaluated to determine if they fall within the circle.

According to one embodiment, a spatially indexed distributed database system is configured to resolve the complexity and ambiguity associated with location-based querying by limiting the number locations that need to be considered for any given location-based query. For example, a typical request for the three closest points to a location can oftentimes have multiple answers. Considering the simple case of a set having four points {(1,0), (0,1), (−1,0), (0,−1)} there are four possible answers to the query "find the three closest points to (0,0)." According to some embodiments, a database implementing spatial ordering can be configured to return a result containing all N points as a valid result, even in cases where returned results exceed any implied limit in the query.

According to one embodiment, the process for finding N points nearest a given location can be represented as an operation of locating the smallest circle centered at a point containing the N closest locations. As discussed above, the circle may contain more than the N number of points being sought by the query, as multiple points can be equivalent based on an applied distance calculation and can be equivalent or nearly so based on geohash value.

Figure 5:
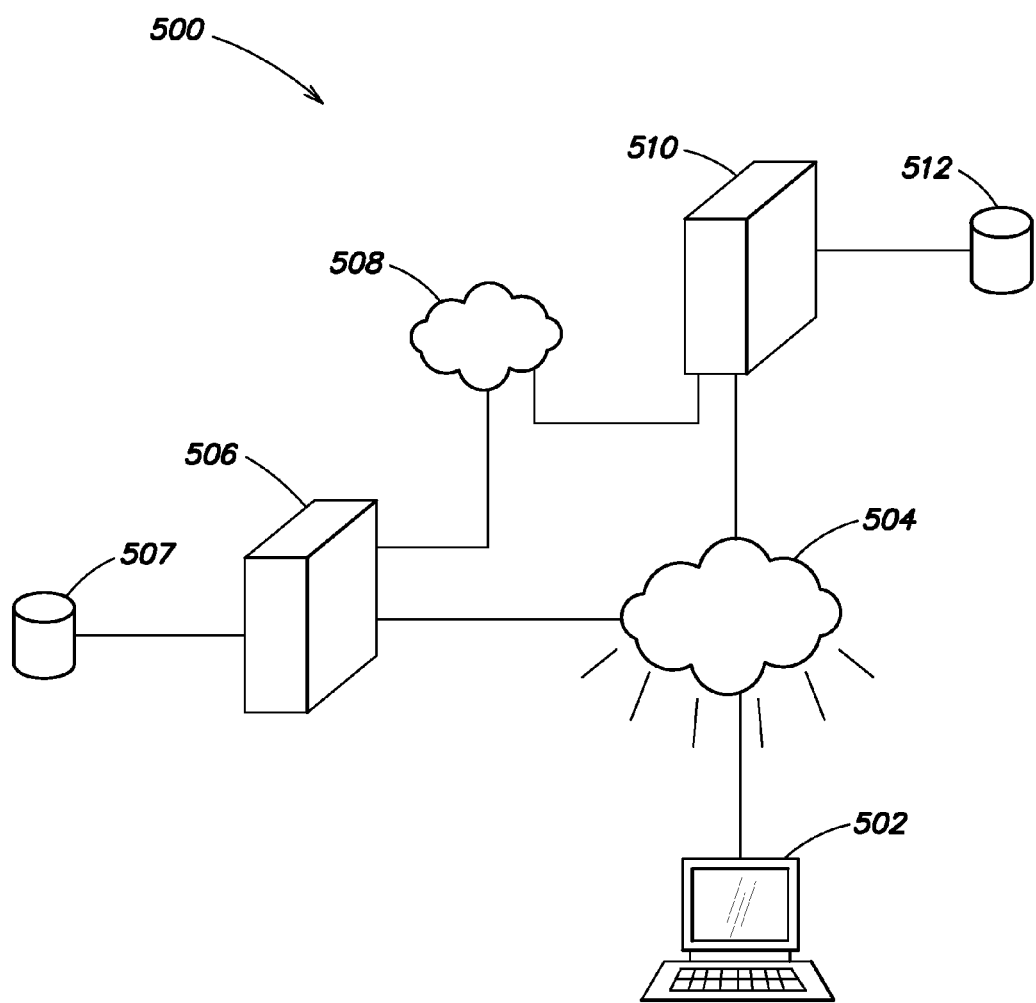
FIG. 5 is block diagram of an example location-based system, according to one aspect of the present invention.

Shown in FIG. 5, is a block diagram of an example system 500 for accepting and processing location-based queries employing geospatial indexing for data units stored in a database. At 502, illustrated is a host computer system connected to a location query system 506 through a communication network 504. Communication network 504 can be a local area network (LAN), wide area network (WAN), public and/or private network for transmitting and receiving information between host computer 502 and system 506. Communication network 504 can be, for example, the Internet. An end user is able to access location information stored on system 506 using a user interface displayed on host computer 502. According to one embodiment, the end user can input requests to receive information using a map based display rendered from information transmitted by system 506 and shown in the user interface displayed on 502. In other embodiments, a query interface can be rendered for direct input of location information, distance requirement, and any additional constraints the end user would like to enter. In one example, an end user is presented with options to enter a query that equates to a request for the three closest coffee shops to my current location having a five star rating. System 506 can be configured to permit querying based on user entered information, and/or information selected by a user in a graphical display.

According to some embodiments, system 506 can be configured to communicate with a geospatial indexing system 510 over a communication network 508. Communication network 508 can be an internal communication network, an external network, LAN, WAN, public and/or private network. Alternatively, and/or in addition system 510 can be reachable over network 504. System 510 can be configured to stored location information for individual data units stored within the database, or can be configured as a distributed database system that operates in conjunction with system 506, with each hosting some portion of the distribute data. In some embodiments, system 506 and system 510 can be members of a replica set, for example, as discussed in co-pending application Ser. No. 12/977,563 entitled "METHOD AND APPARATUS FOR MAINTAINING REPLICA SETS" filed on Dec. 23, 2010, incorporated herein by reference in its entirety.

Both systems 506 and 510 can perform the functions described with respect to 506 and 510 individually, alternatively, and/or in conjunction. For convenience, the operations of 506 and 510 are described separately. System 510 can be configured to generate a geospatial index for data units stored in a database. The data units can be a data record, data relations, a defined entity, a document, a data blob, a file, or other unit of data that operates as a coherent digital representation of, for example, a location and its associated information. In one example, system 510 stores data in database 512. Storage in database 512 is based on documents. In one example, each document contains information about a particular location, and can include information on for example, a restaurant at a particular location, reviews of the restaurant, location information for the restaurant, including longitude and latitude information, although in some embodiments address information is sufficient and external look-ups can be called to retrieve longitude and latitude for a given document.

As discussed, system 506 can store the same information on a respective database 507. In some embodiments, system 506 serves as mapping and/or positioning system and database 507 includes information used to render map based location displays, determine location, provide for user location input, for example.

Returning to system 510, system 510 can be configured to execute processes for indexing location information. The location information can stored directly in database 512 or in some embodiments accessed from an external database, e.g., 507. According to one embodiment, system 510 can include a calculation component configured to transform multi-dimensioned location information into a single dimension value representative of a spatial distance. According to one embodiment, system 510 can be configured to perform processing for indexing location information, including for example, process 100 and/or process 200. In some embodiments, system 510 can be configured to generate an index for the data and its associated location information, that can be used for further processing of location-based requests. In one embodiment, such further processing can occur on system 506, and in other embodiments, the processing can be performed on system 510. In some examples, the indexing operations can be performed prior to receiving location-based requests, in conjunction with processing location-based requests, can be determined dynamically, determined on-line or off-line, among other options.

According to some embodiments, system 510 can be further configured to generate candidate locations based on a received location request. For example, system 506 can receive a location-based query specifying, at least, a location and a distance from the location on which information is desired. System 510 receives the location and distance from system 506. System 510 can use the identified location and distance to determine candidate documents stored in database 512 that meet the specified request using the geospatial index. According to one embodiment, system 510 can be configured to execute processes for identifying candidate locations based on a geospatial index, including for processes 300, 400 and/or 600. Once candidate locations are identified, and for example, their corresponding documents stored in database 512, the need for point by point distance comparisons can be reduced to the candidate documents. In some examples, system 506 can be configured to perform the more precise point to point evaluations to determined if a specific document and its associated location information meets a given distance requirement. In other examples, system 510 can be configured to perform the further processing, including operations to further refine a result set of documents based on any additional criteria provided as part of a location-based request. System 500 is illustrated in FIG. 5 as having one location query system 506 and one geospatial indexing system 510. In some embodiments, system 500 can be configured with systems 506 and/or 510 that are made up of multiple systems, for example, a web server, an application server, and a database server. In some example, there can be multiple systems each having multiple components that perform the operations discussed with respect to systems 506 and 510. Either or both systems 506 and 510 can be configured with a context component designed to process and resolve requests for location-based information with additional query criteria.

In some embodiments, systems for processing location-based queries can include multiple and/or different processes for identifying candidate locations. Various components and/or other systems can use the identified candidate locations to perform finer analysis on the location values for any given data unit directly. In some embodiments, the finer analysis can be used to establish which of the candidate locations actually falls within a given distance from a point of interest.

Referring to FIG. 7, the set S of locations stored in association with data units in a database can be represented by a box 702. In some embodiments, S represents a 2-dimensional cartesian space. A point of interest can be provided by an end user, for example, or communicated by another system, and the point of interest can be accompanied by a distance threshold. The point of interest can be represented virtually, for example, at 704, as can the distance threshold at 706, which form a virtual circle 708. A box 710 can be virtualized within the circle, whose area describes possible locations for data units in the database satisfying the distance threshold. The location values within S can be processed to generate geohash values (e.g., as in process 100 at 104 and/or 200) that can be used to order and/or identify candidate data units quickly and efficiently. As discussed with respect to process 600, a box can be generated to cover the area represented by the circle 708. In some embodiments, additional boundaries can be drawn on each side of box 710 to capture additional area of circle 708, for example as part of process 400 at 412. Process 400 can include an edge capture process 412 used to identify locations that are outside of the initial boundary established for example in step 406.

In some examples, additional virtual boxes can be defined to identify locations which have values that fall outside of the initial boundary. Edge capture can include the use of additional boundaries to insure capture of the areas defined by the circle that fall outside of an intersecting box. In one example, four additional boundaries are computed, corresponding to new virtual boxes on each edge of the original virtual box that corresponds to the original boundary. Multiple additional boundaries can be defined to capture edge positions. And as previously described, the additional boundaries do not need to correspond to geometric shapes. Processes 400 and 600 illustrates just example processes for filtering data units by geohash value. Other processes can be employed and can include sub-processes used in conjunction and/or instead of processes 400 and/or 600.

According to one embodiment, multi-dimensioned values can be defined for spaces having more than one or two dimensions. Hashing functions can be configured to accept multiple inputs to generate single dimension outputs. Further hash values can be used that reduce the number of dimensions of location information rather than generate single dimension values to improve processing. According to some embodiments, the hash function is invertible to generate location values from a single hash value input. In one example, a hashing function interleaves bits of three location values (i.e. three dimensional location information) to generate a single dimension output. The inverse of the hashing function uses the single dimension output to generate the correspond three location values.

As described above, a point of interest can be provided with a given distance requirement. The location can be processed to produce a hash value. From the hash value of the point of interest an identification hash value can be generated. In one example, a prefix is defined for the identification hash value that matches the high order bits of the hash value for the point of interest. The remaining portion of the identification hash value can be padded with zero values. The identification hash value can be used to define an identification boundary for identifying locations with hash values that fall within the boundary. In some examples, the input values can be scaled and/or rounded as described above prior to being input into the hash function.

In one embodiment, the unhash (i.e. the inversion of the hash function) of the identification hash value can be used to determine a location of a lower bound of a cube defined by the range of values for each dimension (e.g. x, y, and z in a three dimensional space) that were padded with zeros. In one example, the cube defined by the ranges of values for x, y, and z can be expanded by shorting the prefix for the identification hash value, which corresponds to larger and larger cubes as the length of prefix is reduced. According to one example, when the hash value is represented in binary, four of the low order bits can be padded with zeros for one of the three dimensions, thus the range of values will occur at binary 0000 up to binary 1111 and the corresponding dimension of the cube will have a length corresponding to the given range. Formulas described above for calculating the length of a side of the rectangle are readily adapted to the calculation of the length of the side of a cube.

In one example, the same number of pad bits can be used for each dimension resulting in a pad length of 12 bits (e.g. for each of an x, y and z position) and the lengths of the sides of the cube correspond to the ranges for each dimension. Although in other examples, different pad lengths for each dimension can be employed.

According to one embodiment, the identification boundary can be expanded until the boundary either intersects a sphere defined by the point of interest and the distance requirement or until the identification boundary encompasses the sphere. According to some embodiments, it can be computationally easier to calculate the encompassing condition, however, the encompassing condition can be more inclusive than establishing an intersection condition and performing edge capture operations, as necessary. According to some embodiments, the described approach can be readily adapted for use with locations with dimensionality greater than two.

The various processes and systems described herein can be implemented on computer systems specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to generate a geospatial index of location information associated with data units stored in a database, identify candidate data units based on a geospatial index, transform multi-dimension location information, compute geohash values, generate candidate identification boundaries, determine distance thresholds, and perform further processing to compute a matching set of results based on additional query criteria.

Various implementations of system for handling location-based requests and for employing geospatial indexing to optimize location calculations can include computer systems that generate geohash values, transform multi-dimension location information into single dimensioned values, define an origin for generating index values, compute an origin for generating index values, calculate a single hash values based on multiple inputs, according to various embodiments of the invention. Further, the computer systems can be configured to calculate candidate locations responsive to a location-based request based on a geospatial indexing and/or ordering, evaluate candidate locations to determine if the candidate locations actually meet any distance requirement, and perform further processing to return a set of results meeting location-based criteria and any additional criteria in a location-based query. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to executing a process for indexing data units stored in a database based on associated location information, generating single dimension values representative of a distance from an origin point, calculating geohash values, executing a process for filtering data in a database to reduce distance calculations required to respond to a location-based request, execute a process for identifying candidate data units in a database based on a geospatial index.

The general purposed computer can be further configured to provide for processing of hash values, implementing various hash functions, reducing multi-dimensioned location values to single hash values, receive location information identifying a point of interest, determine candidate locations within the database within a specified distance from the point of interest, evaluate candidate locations to precisely identifying locations satisfying a location-based request, among other options. It should be appreciated, however, that the system may perform other operations and/or algorithms, including operations for generating transformed location values, identifying longitude and latitude values for a given location, receiving longitude and latitude information for a point of interest, establishing longitude and latitude information for a point of interest, performing comparison of candidate identification boundaries against distance thresholds, calculating edge capture boundaries, etc. The operations and/or algorithms described herein can also be encoded as software executing on hardware that define a processing component, that can define portions of a general-purpose computer, reside on an individual general-purpose computer, and/or reside on multiple general-purpose computers, in addition to and/or in conjunction with spatial indexing/ordering and candidate identification functions.

Figure 9:
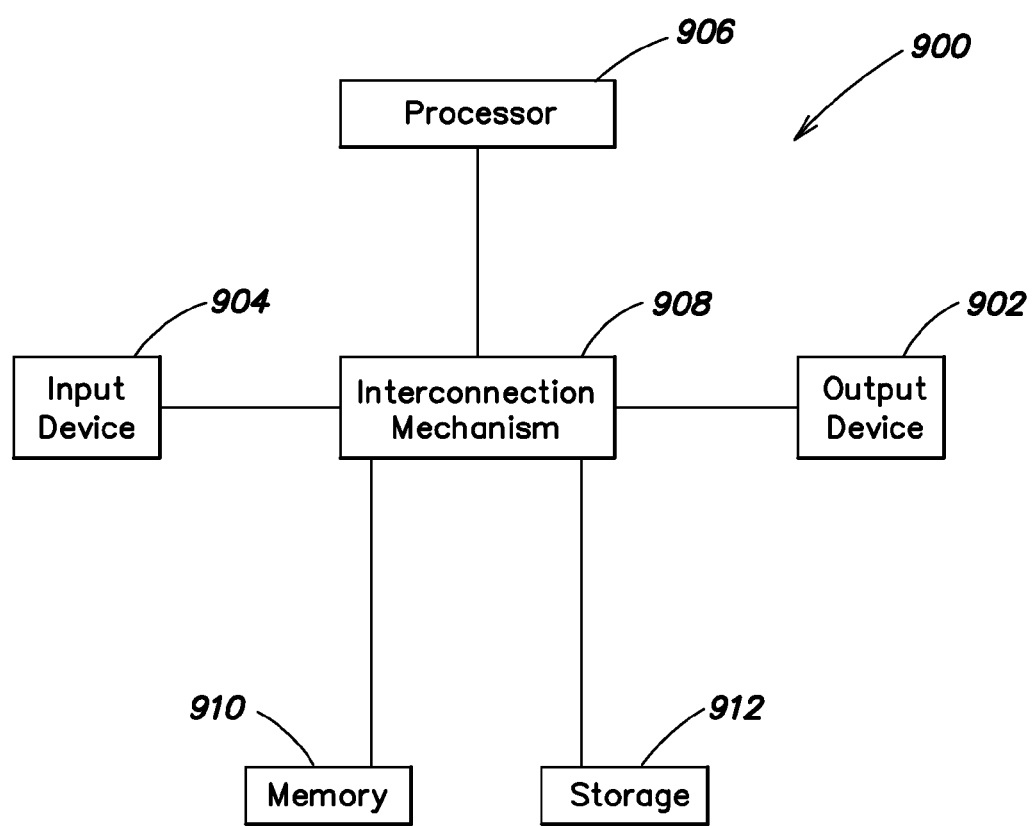
FIG. 9 is a block diagram of an example system for processing location-based operations, on which various aspects of the present invention can be practiced.

FIG. 9 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 11. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
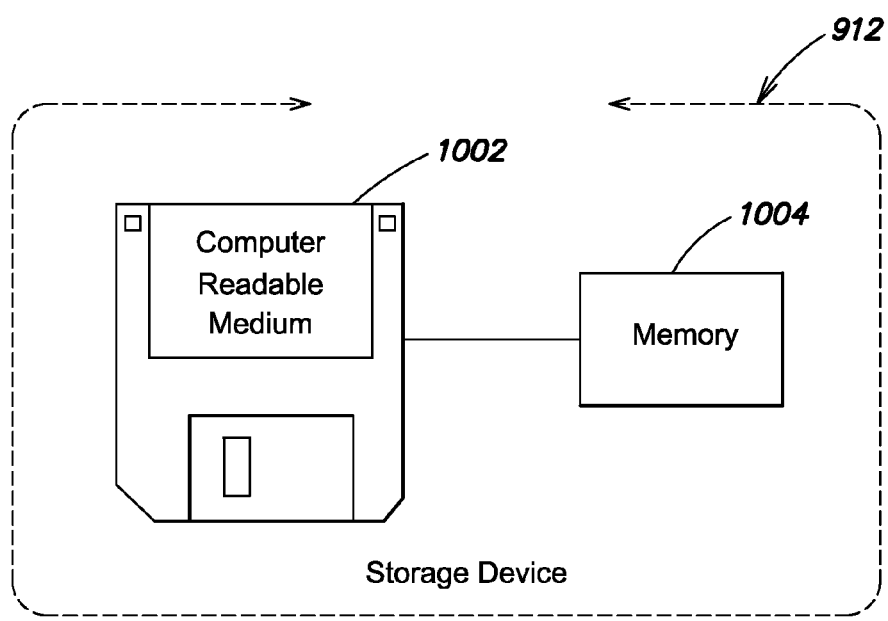
FIG. 10 is a block diagram of an example system for processing location-based operations on which various aspects of the present invention can be practiced.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client location-based requests, interfacing with driver operations, access geospatial indexes, generate geohash values, generate geospatial values, transform location information into single dimensioned values, storing origin locations, accessing location information for a point of interest, receiving point of interest information, receiving distance requirements with point of interest information, calculating distance thresholds, calculating candidate identification boundaries, for example. These systems can also permit client systems to request database operations through a location query system, and/or request database operations directly through a geospatial indexing system, as examples.

There can be other computer systems that perform functions such as generating geospatial index values, indexing caching and/or storage systems, candidate location identification, location evaluation for meeting distance requirements, and can further include functions and support for replica set, including for example, hosting back up only replicas of a database, arbitrating election protocols, executing vote only rights in an election protocol, changing role from secondary to primary, changing role from primary to secondary, reintegrating into a replica set, among other functions. These systems can be distributed among a communication system such as the Internet. One such distributed network, as discussed below with respect to FIG. 11, can be used to implement various aspects of the invention.

Figure 11:
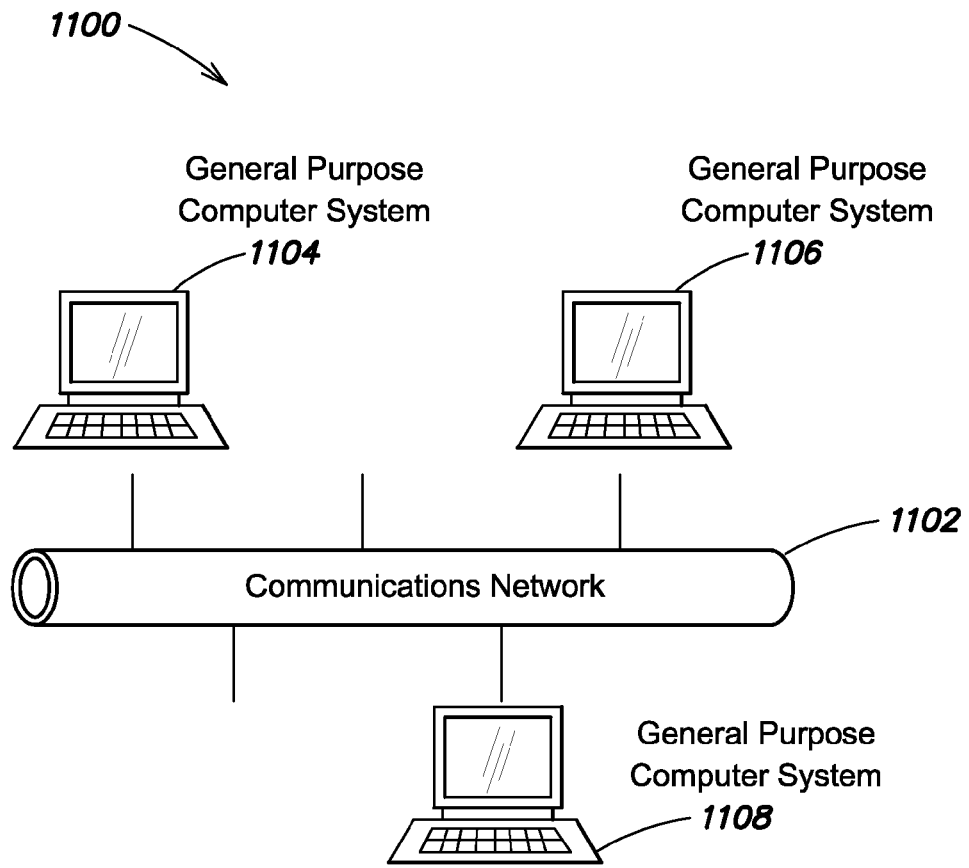
FIG. 11 is a block diagram of an example system for processing location-based operations on which various aspects of the present invention can be practiced.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform functions related to spatially indexing and/or ordering data. Some embodiments can include support for replica sets, providing any of the following functions (in addition to and/or in conjunction with spatially ordering and/or indexing data, generating geohash values, and geohashing as discussed above) hosting a replicated databases, and/or automatic failover of primary node role, and/or reintegration of failed primary nodes. In an example of one such system, one or more computer systems 1104, 1106, and 1108 are configured to host spatially ordered data, and/or generate spatially orderings for hosted data. The spatially ordered data on is configured to be accessed in response to client requests. In one setting access to the database occurs through various APIs and associated drivers. It should be understood that the one or more computer systems 1104, 1106, and 1108 can also be used to execute other operations associated with spatially indexed and/or ordered data. Further, it should be understood that the one or more computer systems 1104, 1106, and 1108 can also be used to execute other replica set functions in additional to and/or in conjunction with spatial indexing and/or ordering operations, and can include for example, functions for failover operations, to determine replication state, to participate in elections processes, etc. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions and client location-based requests. Network 1102 may also include, as part of a system for optimizing processing of location-based requests, connections between various system components, which can each be implemented on general-purpose computers that cooperate to perform various functions including processing of hash values, implementing various hash functions, reducing multi-dimensioned location values to single hash values, receive location information identifying a point of interest, determine candidate locations within the database within a specified distance from the point of interest, evaluate candidate locations to precisely identifying locations satisfying a location-based request, among other options. It should be appreciated, however, that the system components may perform other operations and/or algorithms, including operations for generating transformed location values, identifying longitude and latitude values for a given location, receiving longitude and latitude information for a point of interest, establishing longitude and latitude information for a point of interest, performing comparison of candidate identification boundaries against distance thresholds, calculating edge capture boundaries, etc.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for optimizing processing of location-based requests, the system comprising:
   at least one processor operatively connected to a memory;
   a hash component executable by the at least one processor and configured to generate a single dimension geospatial index from multi-dimension location inputs, the geospatial index comprising a plurality of bits;
   an access component executable by the at least one processor and configured to access a given location for a point of interest and a distance threshold, wherein the given location and the distance threshold define a search area; and
   an identification component executable by the at least one processor and configured to identify which locations associated with data in a database are within a distance from the point of interest, wherein the identification component is further configured to:
      identify a subset of bits from the plurality of bits in of the geospatial index of the given location based on the distance threshold, the subset of bits including the most significant bits of the geospatial index and having fewer bits than the geospatial index;
      generate the identification boundary based on the identified subset of bits in the geospatial index; and
      identify locations within the distance from the point of interest based on the generated identification boundary.

2. The system according to claim 1, wherein the hash component is further configured to generate the single dimension geospatial index from a pair of location coordinates.

3. The system according to claim 2, wherein the hash component is further configured to interleave bits representing a first location value and a second location value from the pair of location coordinates to generate the single dimension geospatial index.

4. The system according to claim 3, wherein the hash component is further configured to reduce the first location value and the second location value by a respective minimum prior to generating the single dimension geospatial index.

5. The system according to claim 4, wherein the hash component is further configured to scale the reduced first location value and the reduced second location value prior to generating the single dimension geospatial index.

6. The system according to claim 5, wherein the hash component is further configured to round the reduced first location value and the reduced second location value to generate inputs to produce the single dimension geospatial index.

7. The system according to claim 1, wherein the identification component is further configured to:
   generate an identification geospatial index, wherein the identification geospatial index includes the subset of bits; and
   compute dimensions of the identification boundary based, at least in part, on the length of the subset of bits.

8. The system according to claim 7, wherein the hash component is further configured to invert the identification geospatial index to obtain identification boundary coordinates, and wherein the identification component is further configured to determine a position for the identification boundary based on the identification boundary coordinates.

9. The system according to claim 8, wherein the identification component is further configured to determine whether the dimensions of the identification boundary, at least, intersect with an outer bound of the search area.

10. The system according to claim 9, wherein the identification component is further configured to determine whether a condition is true in order to determine whether the identification boundary at least intersects with an outer bound of the search area, wherein the condition is at least one of:
    an abscissa of a lower left corner of the identification boundary is less than the abscissa of the search area's center minus the distance threshold;
    the abscissa an of upper-right corner of the identification boundary is greater than an abscissa of the search area's center plus the distance threshold;
    the ordinate of a lower-left corner of the identification boundary is less than an ordinate of the search area's center minus the distance threshold; and
    an ordinate of an upper-right corner of the identification boundary is greater than the ordinate search area's center plus the distance threshold.

11. The system according to claim 1, further comprising a determination component configured to determine which locations associated with data in a database are within the identification boundary, based on a respective geospatial index for a respective location associated with data in the database.

12. The system according to claim 11, wherein the determination component is further configured to determine whether the respective geospatial index for the respective location is within a range defined by the identification boundary.

13. The system according to claim 12, wherein the range defined by the identification boundary is determined based on the subset of bits in the geospatial index for the given location.

14. The system according to claim 11, further comprising a confirmation component configure to determine that a location determined to be within the identification boundary based on the respective geospatial index, is within the search area using location values corresponding to the respective geospatial index.

15. The system according to claim 14, wherein the confirmation component is configured to obtain the location values corresponding to the respective geospatial index based on at least one of a lookup in the database and an inversion of the respective geospatial index to obtain a location pair.

16. A computer implemented method for optimizing processing of location-based requests, the method comprising act of:
   accessing, by a computer system, multi-dimensioned location information associated with data in a database;
   transforming, by the computer system, the multi-dimensioned location information into a single dimension geospatial index comprising a plurality of bits; and
   identifying, by the computer system, data in the database having a location within a distance from a point of interest, wherein the act of identifying includes:
      identifying a subset of bits from the plurality of bits in the geospatial index of the given location based on a magnitude of the distance, the subset of bits including the most significant bits of the geospatial index and having fewer bits than the geospatial index;
      generating an identification boundary based on the identified subset of bits in the geospatial index; and
      identifying locations within the distance from the point of interest based on the generated identification boundary.

17. The method according to claim 16, wherein the method further comprises an act of determining, by the computer system, that the identification boundary, at least, intersects with an outer bound of a search area defined by the point of interest and a distance threshold.

18. The method according to claim 16, further comprising an act of expanding the identification boundary until the identification boundary, at least, intersects with an outer bound of a search area defined by the point of interest and a distance threshold.

19. The method according to claim 16, wherein the act of generating an identification boundary from the subset of bits in the geospatial index includes-generating an identification geospatial index including the subset of bits which corresponds to an identification boundary with dimensions based, at least in part, on the length of the subset of bits.

20. The method according to claim 19, further comprising acts of:
   inverting the identification geospatial index to obtain identification boundary coordinates; and
   establishing the identification boundary on the identification boundary coordinates.

21. The method according to claim 16, wherein the act of identifying, by the computer system, data in the database having a location within a distance from a point of interest, includes determining which locations associated with data in a database are within the identification boundary, based on a respective geospatial index for a respective location.

22. The method according to claim 21, wherein the act of determining includes determining the respective geospatial index for the respective location is with a range defined by the identification boundary.

23. The method according to claim 22, wherein the method further comprises an act of determining the range based on the subset of bits in the geospatial index for the given location.

24. The method according to claim 21, wherein the act of identifying includes an act of comparing respective location values corresponding to the respective geospatial index to the given location to determine the respective location values are within the search area, wherein the respective location values are determined to be within the identification boundary based on the respective geospatial index.

25. The method according to claim 14, wherein the act of comparing includes an act of obtaining the location values corresponding to the respective geospatial index based on at least one of a lookup in the database and an inversion of the respective geospatial index to obtain a location pair.

* * * * *